United States Patent
Watanabe

(10) Patent No.: US 9,819,866 B2
(45) Date of Patent: Nov. 14, 2017

(54) IMAGE CAPTURING DEVICE, COMMUNICATION APPARATUS, AND CONTROLLING METHOD

(71) Applicant: CANON KABUSHIKI KAISHA, Tokyo (JP)

(72) Inventor: Kenta Watanabe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/146,254

(22) Filed: May 4, 2016

(65) Prior Publication Data

US 2016/0337586 A1 Nov. 17, 2016

(30) Foreign Application Priority Data

May 15, 2015 (JP) ................. 2015-099686

(51) Int. Cl.
*H04N 5/232* (2006.01)
*H04N 1/00* (2006.01)

(52) U.S. Cl.
CPC ..... *H04N 5/23241* (2013.01); *H04N 1/00103* (2013.01); *H04N 5/23206* (2013.01); *H04N 5/23216* (2013.01); *H04N 5/23245* (2013.01); *H04N 2201/0039* (2013.01); *H04N 2201/0055* (2013.01); *H04N 2201/0084* (2013.01)

(58) Field of Classification Search
CPC ........... H04N 5/23241; H04N 5/23206; H04N 5/23216; H04N 5/23245
See application file for complete search history.

(56) References Cited

U.S. PATENT DOCUMENTS

| 8,520,121 | B2* | 8/2013 | Yamamoto | H04N 1/00 348/208.99 |
| 2011/0105199 | A1* | 5/2011 | Tsuchiya | H04M 1/7253 455/574 |
| 2012/0147256 | A1* | 6/2012 | Umeyama | H04N 1/00204 348/372 |
| 2015/0097974 | A1* | 4/2015 | Hamada | H04N 1/00103 348/207.2 |
| 2015/0237191 | A1* | 8/2015 | Moran | H04M 1/0256 455/556.1 |

FOREIGN PATENT DOCUMENTS

JP 2004201073 A 7/2004

* cited by examiner

*Primary Examiner* — James Hannett
(74) *Attorney, Agent, or Firm* — Canon U.S.A., Inc. IP Division

(57) ABSTRACT

In a case where an image capturing device is in a first state and, in a state where the image capturing device is attached to a communication apparatus, it is judged that a first operation is performed, wireless communication with the communication apparatus is maintained and an operation state of the image capturing device is caused to make a transition to a second state; in a case where, in the first state and in a state where the image capturing device is not attached to the communication apparatus, it is judged that the first operation is performed, the wireless communication with the communication apparatus is not maintained; and in the first state, image capturing by the image capturing device and communication of data by the wireless communication are possible, and in the second state, power consumption is less than that of the first state.

17 Claims, 8 Drawing Sheets

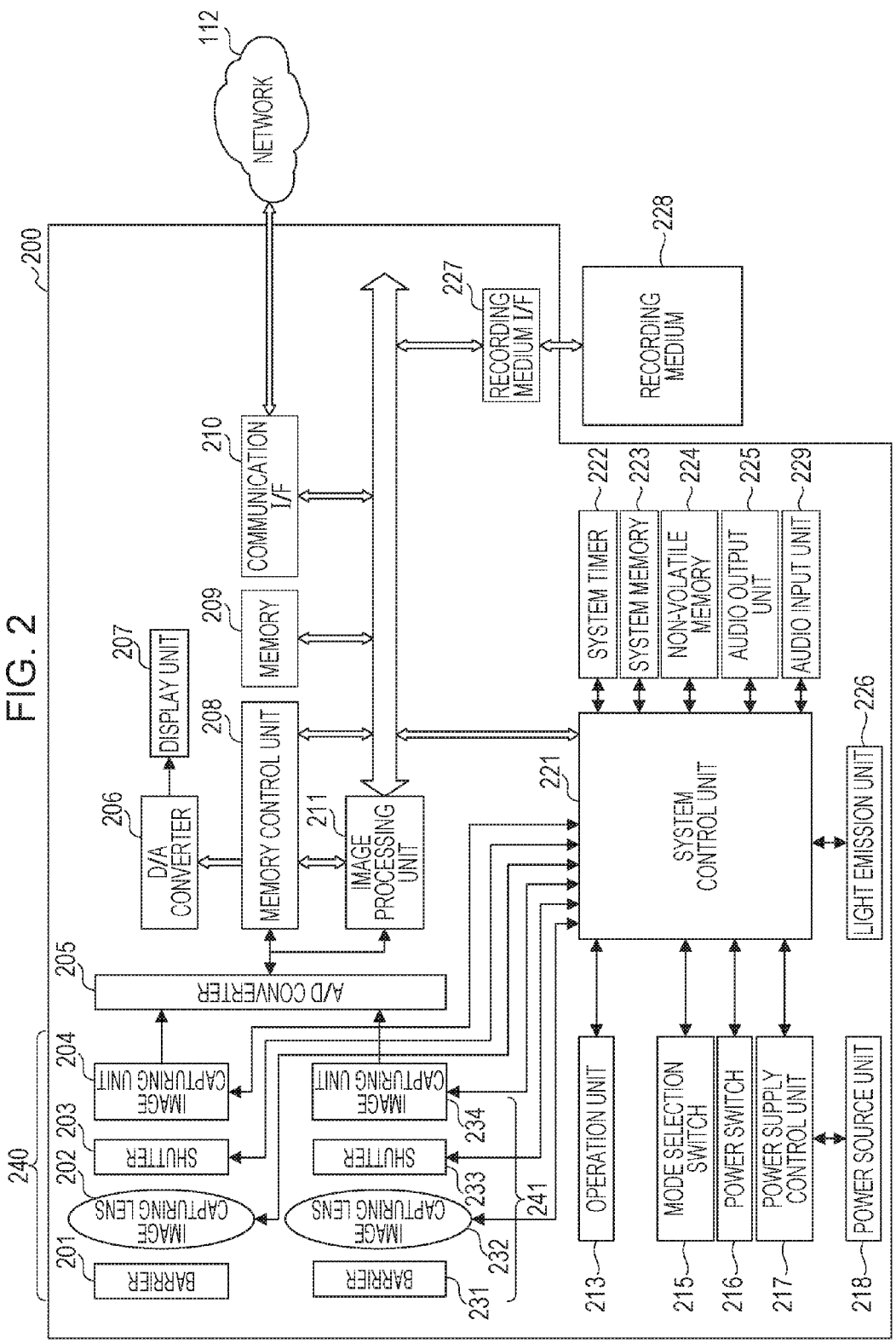

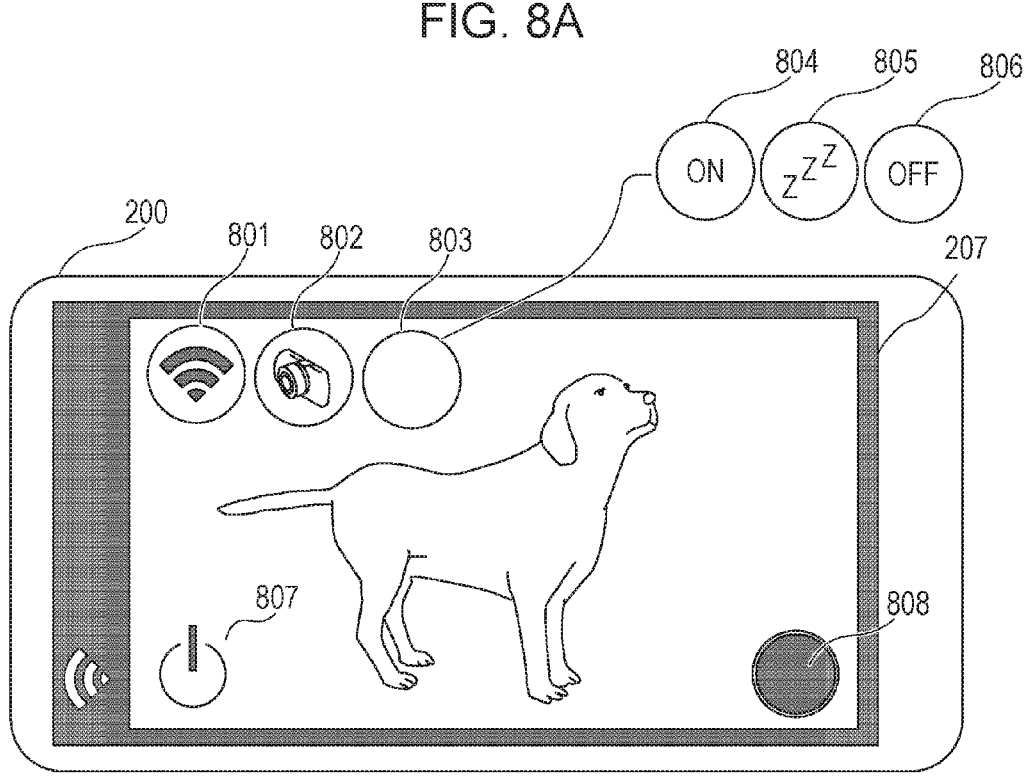
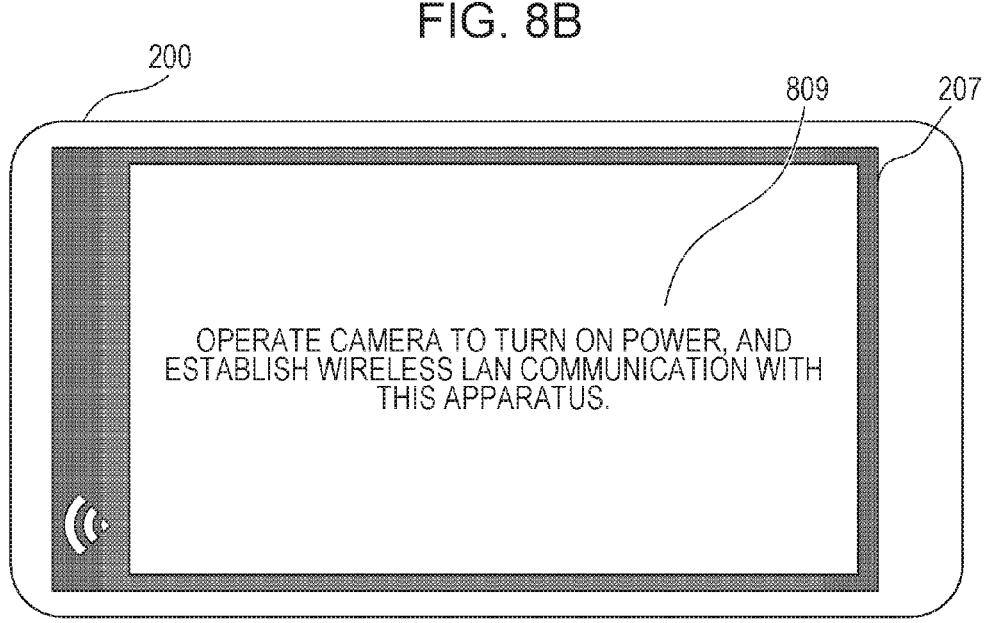

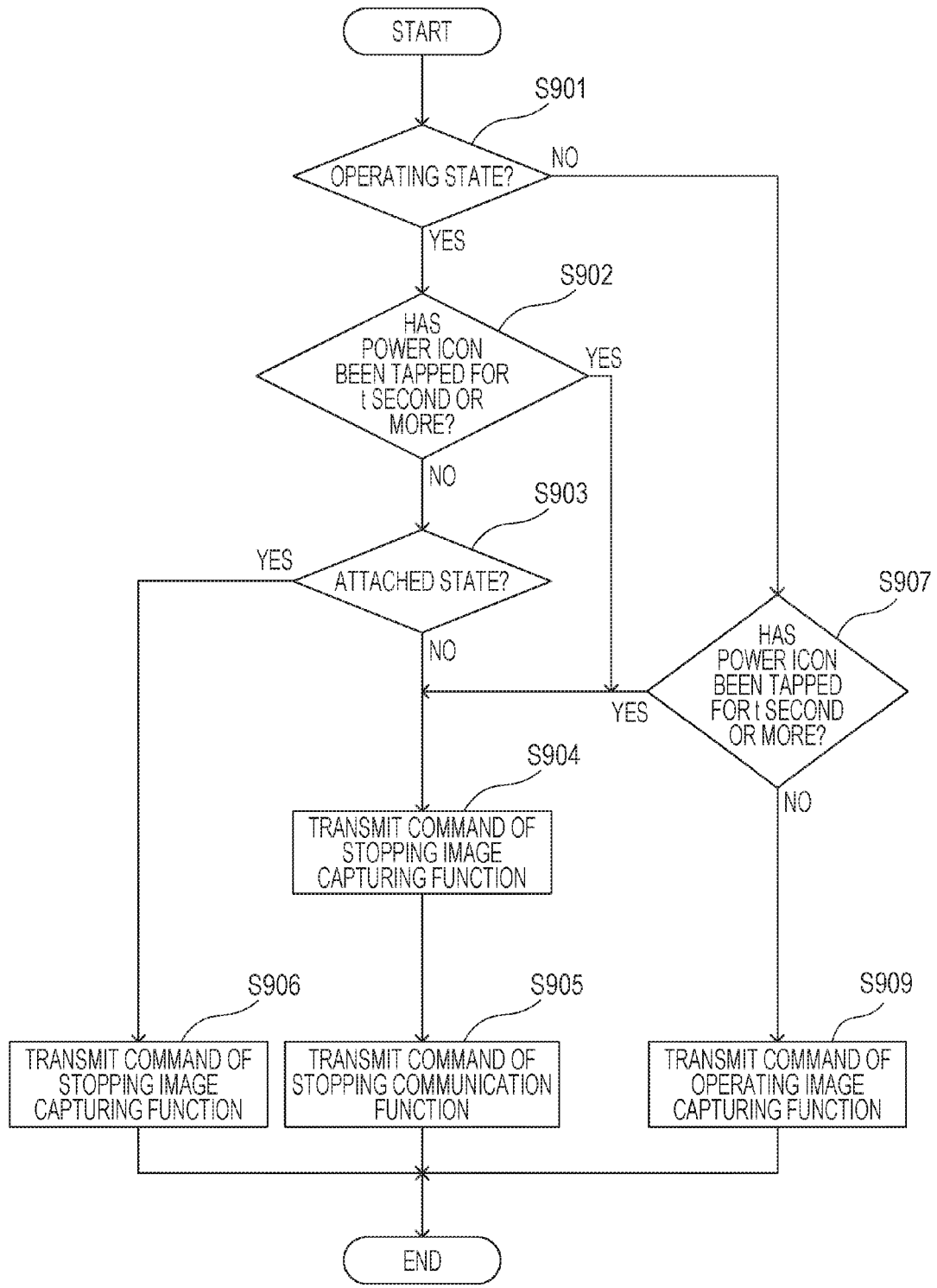

IMAGE CAPTURING DEVICE, COMMUNICATION APPARATUS, AND CONTROLLING METHOD

BACKGROUND OF THE INVENTION

Field of the Invention

The present invention relates to operations of an image capturing device and a communication apparatus.

Description of the Related Art

A digital camera whose main body unit and image capturing unit are able to be separated has been known. As an example of such a digital camera, a digital camera of Japanese Patent Laid-Open No. 2004-201073 will be described. The digital camera of Japanese Patent Laid-Open No. 2004-201073 includes a main body unit and an image capturing unit. The image capturing unit is able to be separated from the main body unit, and when the image capturing unit is separated from the main body unit, the image capturing unit and the main body unit perform wireless communication. Then, when a user operates the main body unit, photography is able to be performed in a state where the image capturing unit is separated from the main body unit.

Moreover, at the present time, while functionality of a camera incorporated in a cellular phone is being raised remarkably, a demand for using an image having higher quality in a cellular phone is increasing, so that a digital camera in which an image capturing function is specialized (hereinafter, referred to as an image capturing device) has appeared. This image capturing device is capable of being attached to a communication apparatus such as a cellular phone, and communicates with the communication apparatus in a wireless manner. A user is able to perform photography by operating the communication apparatus to which the image capturing device is attached, and obtain a feeling of use such that a camera of the communication apparatus is exchanged for a lens having an excellent performance. A technique by which such an image capturing device is used more efficiently has been required.

SUMMARY OF THE INVENTION

One aspect of the invention is an image capturing device capable of being attached to a communication apparatus for use, including: an image capturing unit; a communication control unit configured to control wireless communication with the communication apparatus; and a transition unit configured to cause an operation state of the image capturing device to make a transition to any of a plurality of operation states including a first state in which image capturing by the image capturing device and communication of data by the wireless communication are possible and a second state in which power consumption is less than that of the first state.

In such an image capturing device, in a case where, in the first state and in a state where the image capturing device is attached to the communication apparatus, it is judged that a first operation is performed, the communication control unit performs control of maintaining the wireless communication with the communication apparatus and the transition unit causes the operation state of the image capturing device to make a transition to the second state; and in a case where, in the first state and in a state where the image capturing device is not attached to the communication apparatus, it is judged that the first operation is performed, the communication control unit does not perform control of maintaining the wireless communication with the communication apparatus.

Further features of the present invention will become apparent from the following description of exemplary embodiments with reference to the attached drawings.

BRIEF DESCRIPTION OF THE DRAWINGS

FIG. 2 is a block diagram illustrating a configuration of a cellular phone.

FIGS. 8A and 8B are views illustrating examples of a screen of a cellular phone in the second exemplary embodiment.

FIG. 9 is a flowchart illustrating an operation of the cellular phone in the second exemplary embodiment.

DESCRIPTION OF THE EMBODIMENTS

Description will be hereinafter given for some exemplary embodiments of the invention with reference to the accompanying drawings.

First Exemplary Embodiment (Configuration of Digital Camera 100)

A digital camera 100 and a cellular phone 200 of a first exemplary embodiment will be described below.

Figure 1:
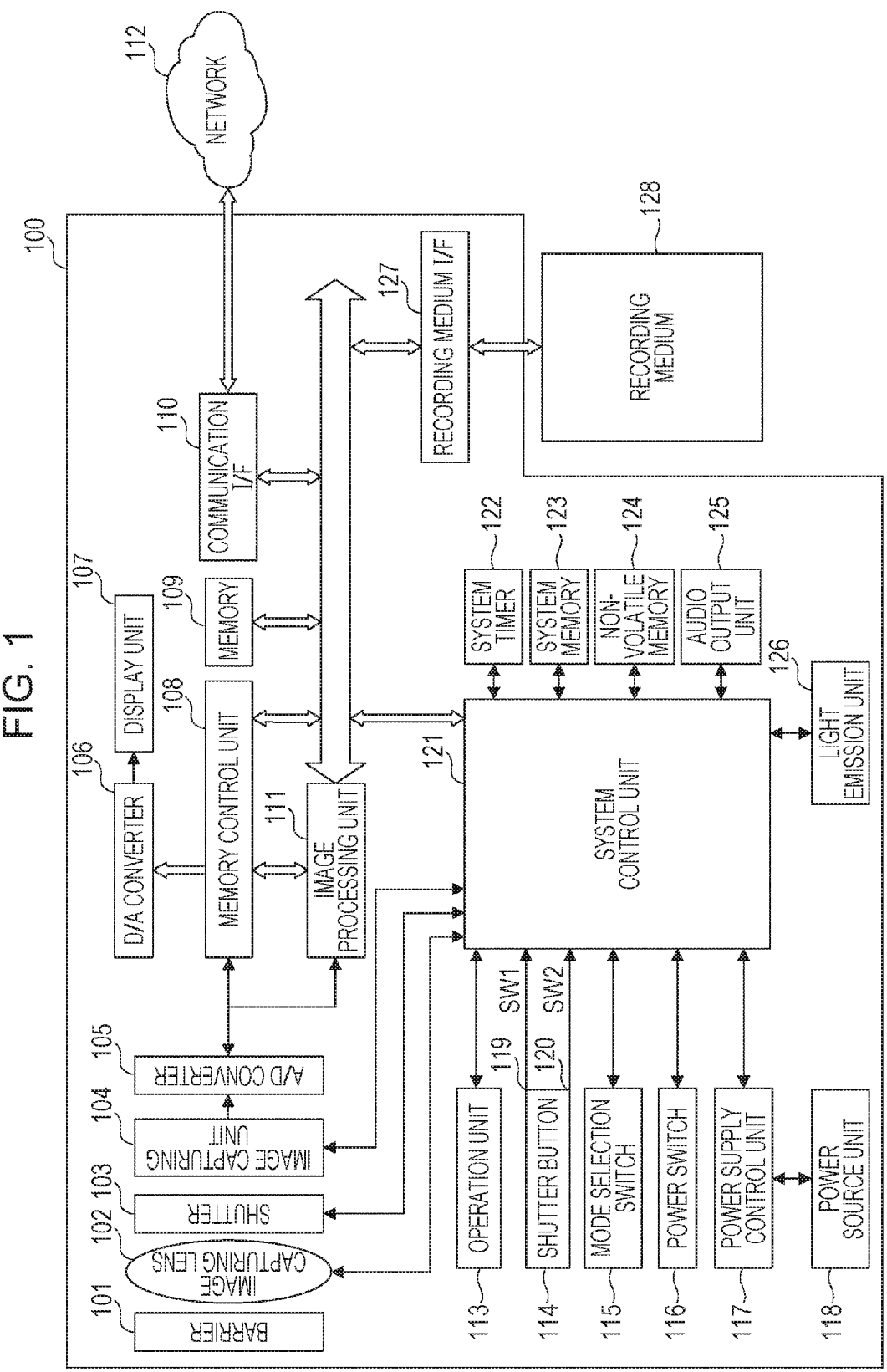
FIG. 1 is a block diagram illustrating a configuration of a digital camera.

First, each unit which constitutes the digital camera 100 will be described with reference to FIG. 1. FIG. 1 is a block diagram illustrating a configuration of the digital camera 100. Note that, the digital camera 100 is one example of an image capturing device.

An image capturing lens 102 is a lens group including a zoom lens and a focus lens.

A shutter 103 is a shutter having an aperture function.

An image capturing unit 104 is an image capturing element, which converts an optical image into an electrical signal, and composed of a CCD, a CMOS element, or the like.

An A/D converter 105 converts an analogue signal into a digital signal. The A/D converter 105 is used for converting the analogue signal output from the image capturing unit 104 into the digital signal.

By covering an image capturing system including the image capturing lens 102, the shutter 103, and the image capturing unit 104, a barrier 101 prevents a stain and a damage of the image capturing system.

An image processing unit 111 performs resizing processing, such as a predetermined pixel interpolation and a reduction, and color conversion processing to data from the A/D converter 105 or data from a memory control unit 108. Furthermore, the image processing unit 111 performs predetermined arithmetic processing by using captured image data, and based on a result obtained from the arithmetic processing, a system control unit 121 performs exposure control and distance measurement control. Thereby, AF (autofocus) processing, AE (automatic exposure) processing, and EF (flash preliminary emission) processing are performed in a TTL (through the lens) method. The image processing unit 111 further performs predetermined arithmetic processing by using the captured image data, and based on a result obtained from the arithmetic processing, performs AWB (auto white balance) processing in the TTL method.

Output data from the A/D converter 105 is directly written in a memory 109 via the image processing unit 111 and the memory control unit 108, or via the memory control unit 108. In the memory 109, image data, which is obtained by the image capturing unit 104 and converted into digital data by the A/D converter 105, is stored. The memory 109 is provided with a storage capacity sufficient for storing the predetermined number of still images and a predetermined amount of time of moving images and audios.

A non-volatile memory 124 is a memory which is electrically erasable and recordable, and an EEPROM is used, for example. In the non-volatile memory 124, a constant for operating the system control unit 121, a program, and the like are stored. The program here includes a program for executing processing in various flowcharts which will be described below in the present exemplary embodiment.

The system control unit 121 controls the digital camera 100 as a whole. The system control unit 121 realizes each processing of the present exemplary embodiment, which will be described below, by executing the program recorded in the non-volatile memory 124 described above. Moreover, the system control unit 121 performs, for example, display control by controlling the memory 109 and a D/A converter 106.

As a system memory 123, a RAM is used. In the system memory 123, a constant and a variable for operating the system control unit 121, a program read from the non-volatile memory 124, and the like are developed.

A system timer 122 is a clocking unit which measures, by referring to an incorporated clock, a time and the like used for various controls.

A mode selection switch 115, a shutter button 114, a first shutter switch 119, a second shutter switch 120, an operation unit 113, and a power switch 116 are operation units configured to allow input of instructions of various operations to system control unit 121.

The mode selection switch 115 is a switch for selecting any one operation mode of the system control unit 121 from a still image recording mode, a moving image recording mode, and the like. Examples of modes included in the still image recording mode include an automatic image capturing mode, an automatic scene determining mode, a manual mode, various scene modes which provide image capturing setting for each image capturing scene, a program AE mode, a custom mode, and the like. Any of these modes included in the still image recording mode is directly selected by the mode selection switch 115. Note that, any of these modes included in the still image recording mode may also be selected by using another operation member, after selection is once performed for the still image recording mode by the mode selection switch 115. Similarly, the moving image recording mode may also include a plurality of modes.

The first shutter switch 119 is turned ON by a so-called half press (instruction of preparation for image capturing) during an operation of the shutter button 114 provided in the digital camera 100, and generates a first shutter switch signal SW1. In response to the first shutter switch signal SW1, the system control unit 121 starts operations of AF (autofocus) processing, AE (automatic exposure) processing, AWB (auto white balance) processing, EF (flash preliminary emission) processing, and the like.

The second shutter switch 120 is turned ON by completion of the operation of the shutter button 114, which is a so-called full press (instruction of image capturing), and generates a second shutter switch signal SW2. In response to the second shutter switch signal SW2, the system control unit 121 starts operations of a series of image capturing processing from reading of a signal from the image capturing unit 104 to writing of image data to a recording medium 128.

Respective operation members of the operation unit 113 are assigned a function appropriate for each scene when various function icons displayed on a display unit 107 are selected and operated, for example, and act as various function buttons. Examples of the function buttons include an end button, a return button, an attribute change button, and the like. When a menu button is pressed, for example, a menu screen with which various settings are allowed is displayed on the display unit 107. By using the menu screen displayed on the display unit 107, a four-way button of up and down and left and right, and a SET button, a user is able to intuitively perform various settings.

A power supply control unit 117 is composed of a battery detecting circuit, a DC-DC converter, a switch circuit which switches a block to be electrified, and the like, and detects whether or not a battery is installed, a type of the battery, and a remaining battery level. Furthermore, based on a detection result of the remaining battery level and an instruction from the system control unit 121, the power supply control unit 117 controls the DC-DC converter and supplies a necessary voltage to, in addition to the recording medium 128, respective units for a necessary period of time.

A power source unit 118 is composed of a primary battery such as an alkaline battery or a lithium battery, a secondary battery such as a NiCd battery, a NiMH battery, or a Li battery, an AC adaptor, and the like.

A recording medium I/F 127 is an interface with the recording medium 128 such as a memory card or a hard disk.

The recording medium 128 is a recording medium such as a memory card, in which a captured image is recorded, and composed of a semiconductor memory, a magnetic disk, and the like.

An audio output unit 125 is capable of outputting audio data to a user and informing the user of various types of information.

A light emission unit 126 emits light to an object.

A communication I/F 110 is an interface for transmitting/receiving various data such as a file and a command to/from an external apparatus via a network 112 or the like. A wireless interface such as a wireless LAN or Bluetooth (registered trade mark) is used for the communication I/F 110. Note that, the digital camera 100 may include a plurality of system control units 121, power supply control units 117, and power source units 118.

In addition, the digital camera 100 in the present exemplary embodiment is able to be operated by remote control from a cellular phone 200 which will be described below, and may serve as a device dedicated to the remote control. In this case, the digital camera 100 only needs to have a minimal configuration required for image capturing. For example, it may be set that all of captured image data is transmitted to the cellular phone 200 described below. In this case, the recording medium I/F 127 and the recording medium 128 are not always necessary. Further, it may be set that an operation of the digital camera 100 is allowed only by the remote control from the cellular phone 200. In this case, the operation unit 113, the shutter button 114, and the mode selection switch 115 are not always necessary. In addition, various menus and a captured image may be displayed by the cellular phone 200. In this case, the display unit 107 is not always necessary.

(Configuration of Cellular Phone 200)

Next, each unit which constitutes the cellular phone 200 which is one example of the communication apparatus will be described with reference to FIG. 2. FIG. 2 is a block diagram illustrating a configuration of the cellular phone 200.

Note that, though description will be given here for the cellular phone 200 as one example of the communication apparatus, the communication apparatus is not limited to the cellular phone 200. For example, an information processing apparatus such as a portable media player, a so-called tablet device, a personal computer, or a smartphone may be used as the communication apparatus.

Moreover, the cellular phone 200 is set to be capable of executing various functions by installing corresponding applications. A camera application for realizing various camera functions is installed in the cellular phone 200. The camera application may be installed in advance at a time of shipping the cellular phone 200, or may be installed by an operation of a user.

A front camera 240 is attached to a surface of the cellular phone 200, which is in a side where a display unit 207 is arranged, and used when, for example, the user of the cellular phone 200 captures an image of his/her own face. The front camera 240 includes a barrier 201, an image capturing lens 202, a shutter 203, and an image capturing unit 204.

A rear camera 241 is attached to a surface of the cellular phone 200, which is a surface opposite to the surface where the display unit 207 is arranged, and used when, for example, the user of the cellular phone 200 captures an image of an external object. The rear camera 241 includes a barrier 231, an image capturing lens 232, a shutter 233, and an image capturing unit 234.

The image capturing lenses 202 and 232 are lens groups each of which includes a zoom lens and a focus lens.

The shutters 203 and 233 are shutters each of which has an aperture function.

The image capturing units 204 and 234 are image capturing elements, each of which converts an optical image into an electrical signal, and respectively composed of a CCD, a CMOS element, or the like.

By covering an image capturing system of the front camera 240, which includes the image capturing lens 202, the shutter 203, and the image capturing unit 204, the barrier 201 of the front camera 240 prevents a stain and a damage of the image capturing system of the front camera 240. Similarly, by covering an image capturing system of the rear camera 241, which includes the image capturing lens 232, the shutter 233, and the image capturing unit 234, the barrier 231 of the rear camera 241 prevents a stain and a damage of the image capturing system of the rear camera 241.

An A/D converter 205 converts an analogue signal into a digital signal. The A/D converter 205 is used for converting the analogue signal output from the image capturing unit 204 or 234 into the digital signal.

An image processing unit 211 performs resizing processing, such as a predetermined pixel interpolation and a reduction, and color conversion processing to data from the A/D converter 205 or data from a memory control unit 208.

Furthermore, the image processing unit 111 performs predetermined arithmetic processing by using captured image data, and based on a result obtained from the arithmetic processing, a system control unit 221 performs exposure control and distance measurement control. Thereby, AF (autofocus) processing, AE (automatic exposure) processing, and EF (flash preliminary emission) processing are performed in a TTL (through the lens) method. The image processing unit 211 further performs predetermined arithmetic processing by using the captured image data, and based on a result obtained from the arithmetic processing, performs AWB (auto white balance) processing in the TTL method.

Output data from the A/D converter 205 is directly written in a memory 209 via the image processing unit 211 and the memory control unit 208, or via the memory control unit 208.

In the memory 209, image data, which is obtained by the image capturing unit 204 or 234 and converted into digital data by the A/D converter 205, and image data to be displayed on the display unit 207 are stored. The memory 209 is provided with a storage capacity sufficient for storing the predetermined number of still images and a predetermined amount of time of moving images and audios.

Further, the memory 209 also serves as a memory for image display (video memory). A D/A converter 206 converts data for image display, which is stored in the memory 209, into an analogue signal and supplies the resultant to the display unit 207. In this manner, the data for image display, which is written in the memory 209, is displayed by the display unit 207 via the D/A converter 206.

The display unit 207 performs display on a display device such as an LCD in accordance with the analogue signal from the D/A converter 206. The display unit 207 is able to function as an electronic viewfinder and perform live-view display. In order to cause the display unit 207 to function as the electronic viewfinder, the D/A converter 206 performs analogue conversion for digital signals, which have been subjected to A/D conversion by the A/D converter 205 once and accumulated in the memory 209, and consecutively transfers them to the display unit 207 for display on the display unit 207.

A non-volatile memory 224 is a memory which is electrically erasable and recordable, and an EEPROM or the like is used, for example. In the non-volatile memory 224, a constant for operating the system control unit 221, a program, and the like are stored. The program stored here includes a program for executing processing in various flowcharts which will be described below in the present exemplary embodiment, and the above-described camera application is also stored in the non-volatile memory 224.

The system control unit 221 controls the cellular phone 200 as a whole. The system control unit 121 realizes each processing of the present exemplary embodiment, which will be described below, by executing the program recorded in the non-volatile memory 224. Moreover, the system control unit 221 performs display control by controlling the memory 209, the D/A converter 206, the display unit 207, and the like.

As a system memory 223, a RAM is used. In the system memory 223, a constant and a variable for operating the system control unit 221, a program read from the non-volatile memory 224, and the like are developed.

A system timer 222 is a clocking unit which measures, by referring to an incorporated clock, a time and the like used for various controls.

An operation unit 213 is an operation unit configured to allow input of instructions of various operations to the system control unit 221, and includes a touch panel arranged on the whole surface of the display unit 207 and operation display displayed on the display unit 207. Any type among various types such as a resistance film type, an electrostatic capacitance type, a surface acoustic wave type, an infrared ray type, an electromagnetic induction type, an image recognition type, and an optical sensor type may be used for the touch panel. The operation display is display in order for the user to perform an operation, and examples thereof include an end button, a return button, an image feeding button, a jumping button, a narrowing-down button, an attribute changing button, a menu button, and the like. When detecting that the user touches the operation display, the system control unit 221 performs processing corresponding to the operation display. When the menu button is touched, for example, the system control unit 221 displays a menu screen, with which various settings are allowed, on the display unit 207.

A mode selection switch 215 is a switch for selecting any one operation mode at a time of image capturing by the cellular phone 200 from a still image recording mode, a moving image recording mode, and the like.

A power switch 216 is a switch for turning on or off power of the cellular phone 200.

A power supply control unit 217 is composed of a battery detecting circuit, a DC-DC converter, a switch circuit which switches a block to be electrified, and the like, and detects whether or not a battery is installed, a type of the battery, and a remaining battery level. Furthermore, based on a detection result of the remaining battery level and an instruction from the system control unit 221, the power supply control unit 217 controls the DC-DC converter and supplies a necessary voltage to, in addition to a recording medium 228, respective units for a necessary period of time.

A power source unit 218 is composed of a primary battery such as an alkaline battery or a lithium battery, a secondary battery such as a NiCd battery, a NiMH battery, or a Li battery, an AC adaptor, and the like.

A recording medium I/F 227 is an interface with the recording medium 228 such as a memory card or a hard disk. The recording medium 228 is a recording medium such as a memory card, in which a captured image is recorded, and composed of a semiconductor memory, a magnetic disk, and the like.

An audio output unit 225 and an audio input unit 229 respectively perform output of an audio to the user and input of an audio from the user, and enable the user to speak over the cellular phone 200. A light emission unit 226 emits light to an object.

When a communication I/F 210 transmits/receives audio data via a telephone line, a call to a remote area becomes possible. Moreover, the communication I/F 210 is used also for an interface for transmitting/receiving various data such as a file and a command to/from an external apparatus via the network 112 or the like. A wireless interface such as a wireless LAN or Bluetooth is used for the communication I/F 210.

(Operations on Touch Panel)

Next, operations on the touch panel included in the operation unit 213 of the cellular phone 200 will be described. The system control unit 221 is able to detect following operations on the touch panel. First one is a touch to the touch panel with a finger or a pen (hereinafter, referred to as a touch-down). Next one is a state where the touch panel is being touched with the finger or the pen (hereinafter, referred to as a touch-on). Next one is a movement of the finger or the pen with the finger or the pen touching the touch panel (hereinafter, referred to as a slide). Next one is a separation of the finger or the pen, which has been touching the touch panel, from the touch panel (hereinafter, referred to as a touch-up). Next one is a state where the finger or the pen is not touching the touch panel (hereinafter, referred to as a touch-off).

These operations and a coordinate of a position of the touch panel, which is touched by the finger or the pen, are notified from the operation unit 213 to the system control unit 221. The system control unit 221 judges what operation has been performed on the touch panel, based on the notified information.

When a touch-up is performed without a slide within a predetermined period of time after a touch-down, the system control unit 221 judges that a tap is performed. The tap is an operation of touching the touch panel only for a moment, and often used as an operation for, for example, designating an item or pressing a button, which is equivalent to a click in the case of a mouse.

(Use Cases)

Next, use cases of an image capturing system including the digital camera 100 and the cellular phone 200 will be described with reference to FIGS. 3A to 3D.

Figure 3A:
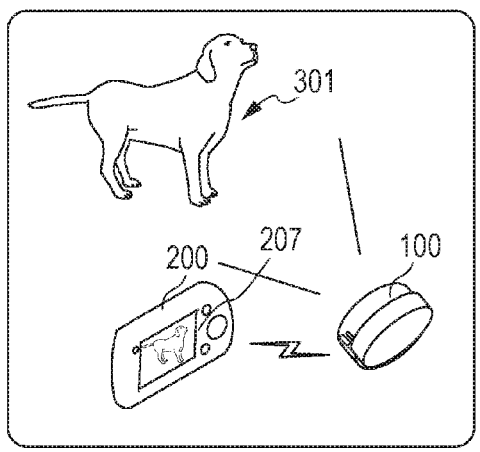
FIGS. 3A to 3D are views illustrating use cases of the digital camera and the cellular phone.

FIG. 3A is a view illustrating a use case in a state where the digital camera 100 is not attached to the cellular phone 200, which is an example in which a user possessing the cellular phone 200 photographs an animal or the like from a position away from the digital camera 100. Note that, examples of other use cases of the state where the digital camera 100 is not attached to the cellular phone 200 include commemorative photography conventionally performed by a self-timer function of a digital camera, and the like.

An object 301 captured by the image capturing unit 104 of the digital camera 100 is displayed on the display unit 207 of the cellular phone 200 possessed by the user. The user operates the cellular phone 200 and transmits an instruction of image capturing from the cellular phone 200 to the digital camera 100 to thereby perform image capturing of the object 301. Communication between the cellular phone 200 and the digital camera 100 is performed via the communication I/F 210 of the cellular phone 200 and the communication I/F 110 of the digital camera 110.

Figure 3B:
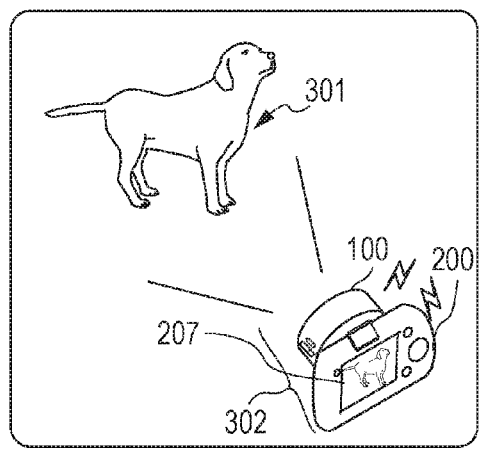

FIG. 3B is a view illustrating a use case in a state where the digital camera 100 is attached to the cellular phone 200. In this use case, the user attaches the digital camera 100 including a lens having a high function, a sensor, the image processing unit 111, and the like to the cellular phone 200 and operates the digital camera 100 and the cellular phone 200 while viewing, for example, display of the cellular phone 200. The user is able to photograph the object 301 by using the cellular phone 200 and the digital camera 100 as one digital camera (hereinafter, referred to as a digital camera 302).

In the use case of FIG. 3B, similarly to FIG. 3A, the object 301 captured by the image capturing unit 104 of the digital camera 100 is displayed on the display unit 207 of the cellular phone 200 possessed by the user. The user operates the cellular phone 200 and transmits an instruction of image capturing from the cellular phone 200 to the digital camera 100 to thereby perform image capturing of the object 301. Communication between the cellular phone 200 and the digital camera 100 is performed via the communication I/F 210 of the cellular phone 200 and the communication I/F 110 of the digital camera 110.

Figure 3C:
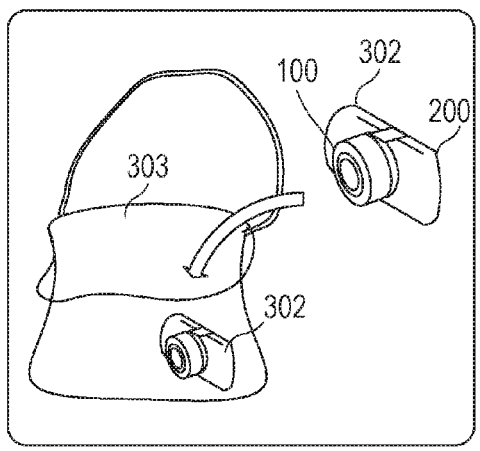
Figure 3D:
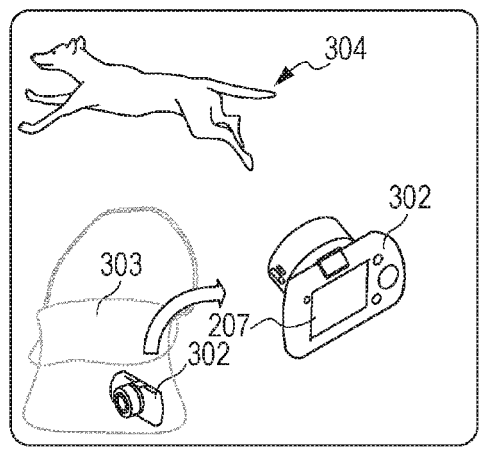

It is assumed that, after photographing the object 301 in the use case as FIG. 3B, the user turns off power of the digital camera 302 and puts it in a shoulder bag 303 as illustrated in FIG. 3C. When the power of the digital camera 100 is turned off, wireless communication between the digital camera 100 and the cellular phone 200 is disconnected. It is set that the user then finds a good opportunity for photography, and, as illustrated in FIG. 3D, the user takes out the digital camera 302 from the shoulder bag 303 to try to photograph an object 304. In this case, since the wireless communication between the digital camera 100 and the cellular phone 200 is disconnected, it takes time to establish the wireless communication again, so that there is a possibility to miss the opportunity for the photography.

That is, in the case of using the digital camera 100 and the cellular phone 200 as the one digital camera 302, when the power of the digital camera 100 is turned off, a wireless communication function is also stopped, and, therefore, the wireless communication with the cellular phone 200 is disconnected. In addition, even if the power of the digital camera 100 is turned on again, it is difficult to establish the wireless communication with the cellular phone 200 immediately. Though disconnecting the wireless communication each time is effective for the digital camera 100 and the cellular phone 200 in terms of power consumption, the user who frequently performs photography may miss an opportunity for the photography.

Then, in the present exemplary embodiment, the wireless communication is to be maintained when the digital camera 100 is attached to the cellular phone 200, even if the power switch 116 of the digital camera 100 is pressed. Specifically, a low-power consumption state is provided as an operation state of the digital camera 100. In the low-power consumption state, the digital camera 100 maintains the communication with the cellular phone 200 by the communication I/F 110, and power consumption of the digital camera 100 is less than that in an operating state 501 described below. Note that, the low-power consumption state will be hereinafter referred to as a sleep state 502. The sleep state 502 will be described below in detail.

(Detection of Attachment State of Digital Camera 100)

Figure 4:
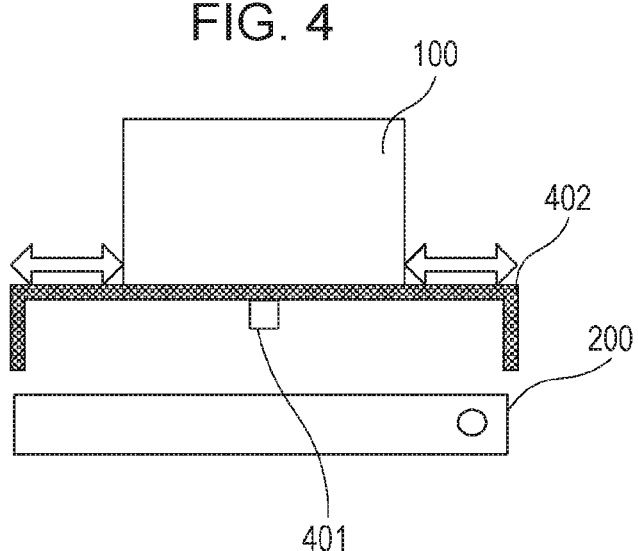
FIG. 4 is a cross section view at a time of attaching the digital camera to the cellular phone.

Next, a method of judging whether or not the digital camera 100 is attached to the cellular phone 200 will be described with reference to FIG. 4. FIG. 4 is a cross section view at a time of attaching the digital camera 100 to the cellular phone 200.

The digital camera 100 has an attaching unit 402 so that the digital camera 100 is attached to the cellular phone 200. A length of the attaching unit 402 is able to be changed freely in accordance with a size of the cellular phone 200. The cellular phone 200 is, for example, fitted into the attaching unit 402, and thereby the digital camera 100 is attached to the cellular phone 200. Note that, the digital camera 100 is able to be attached to any position of the cellular phone 200 within a range in which detection by a switch 401 described below or the like is possible.

The digital camera 100 is provided with the switch 401, which is mechanical, in order to detect whether or not the digital camera 100 is attached to the cellular phone 200, that is, an attachment state of the digital camera 100.

In a state where the digital camera 100 is attached to the cellular phone 200 (hereinafter, referred to as an attached state), the switch 401 is depressed. When the switch 401 is in a state of being depressed, the system control unit 121 of the digital camera 100 judges that the digital camera 100 is in the attached state. On the other hand, when the digital camera 100 is in a state of being detached from the cellular phone 200 (hereinafter, referred to as a non-attached state), the switch 401 which has been depressed projects to a position before being depressed, as illustrated in FIG. 4. When the switch 401 is in a state of projecting, the system control unit 121 of the digital camera 100 judges that the digital camera 100 is in the non-attached state.

The detection of the attachment state of the digital camera 100 may be performed as following examples.

In a first example, the digital camera 100 detects the attachment state by using a contactless communication (Near Field Communication: NFC) interface to detect a contact of the cellular phone 200 and the digital camera 100. When the contact of the cellular phone 200 is detected, the digital camera 100 is judged to be in the attached state. When the contact of the cellular phone 200 is not detected, the digital camera 100 is judged to be in the non-attached state.

In a second example, the digital camera 100 detects the attachment state from intensity of a received signal of the wireless communication. For example, the communication I/F 110 of the digital camera 100 is an interface capable of wireless communication such as Bluetooth or a wireless LAN, and is capable of wireless communication with the cellular phone 200. The system control unit 121 of the digital camera 100 calculates a distance between the cellular phone 200 and the digital camera 100 from the intensity of the signal of the wireless communication, which is received from the cellular phone 200 via the communication I/F 110. The system control unit 121 of the digital camera 100 judges, when the calculated distance is equal to or less than a predetermined threshold, that the digital camera 100 is in the attached state, and, when the calculated distance is more than the predetermined threshold, that the digital camera 100 is in the non-attached state.

Note that, detection of the attachment state in the first example and the second example may be performed by the cellular phone 200. A result of the detection by the cellular phone 200 is transmitted to the digital camera 100.

In a third example, the cellular phone 200 detects the attachment state by analyzing a video of the rear camera 241 and transmits a result of the detection to the digital camera 100.

For example, when the digital camera 100 is attached to the cellular phone 200, the rear camera 241 of the cellular phone 200 is covered by the digital camera 100 depending on an attached position. Further, if the user tries to perform image capturing in a state where the digital camera 100 is attached to the cellular phone 200, when the user uses the cellular phone 200 as a grip, a hand of the user covers the rear camera 241 in some cases. Then, when the video of the rear camera 241 is interrupted, the system control unit 221 of the cellular phone 200 judges that the digital camera 100 is in the attached state.

Moreover, when the digital camera 100 is attached to the cellular phone 200, the video of the rear camera 241 of the cellular phone 200 includes the digital camera 100 in some cases. When the digital camera 100 is included in the video of the rear camera 241, the system control unit 221 of the cellular phone 200 judges that the digital camera 100 is in the attached state.

In a fourth example, the digital camera 100 analyzes the video of the rear camera 241 of the cellular phone 200 and a video of the digital camera 100 to detect the attachment state according to whether or not the same object is captured.

For example, the system control unit 121 of the digital camera 100 receives the video of the rear camera 241 of the cellular phone 200 via the communication I/F 110. The system control unit 121 of the digital camera 100 then compares the received video of the rear camera 241 and the video that the digital camera 100 captured by the image capturing unit 104. When making a judgment that the both are the videos in which the same object is captured, the system control unit 121 of the digital camera 100 judges that the digital camera 100 is in the attached state. When making a judgment that the respective videos captured different objects, the system control unit 121 of the digital camera 100 judges that the digital camera 100 is in the non-attached state.

Note that, the detection of the attachment state in the fourth example may be performed by the cellular phone 200. In this case, the video captured by the digital camera 100 is transmitted to the cellular phone 200. The cellular phone 200 compares the transmitted video and the video of the rear camera 241 to detect the attachment state, and transmits a result of the detection to the digital camera 100.

(Transitions of Operation States of Digital Camera 100)

Figure 5:
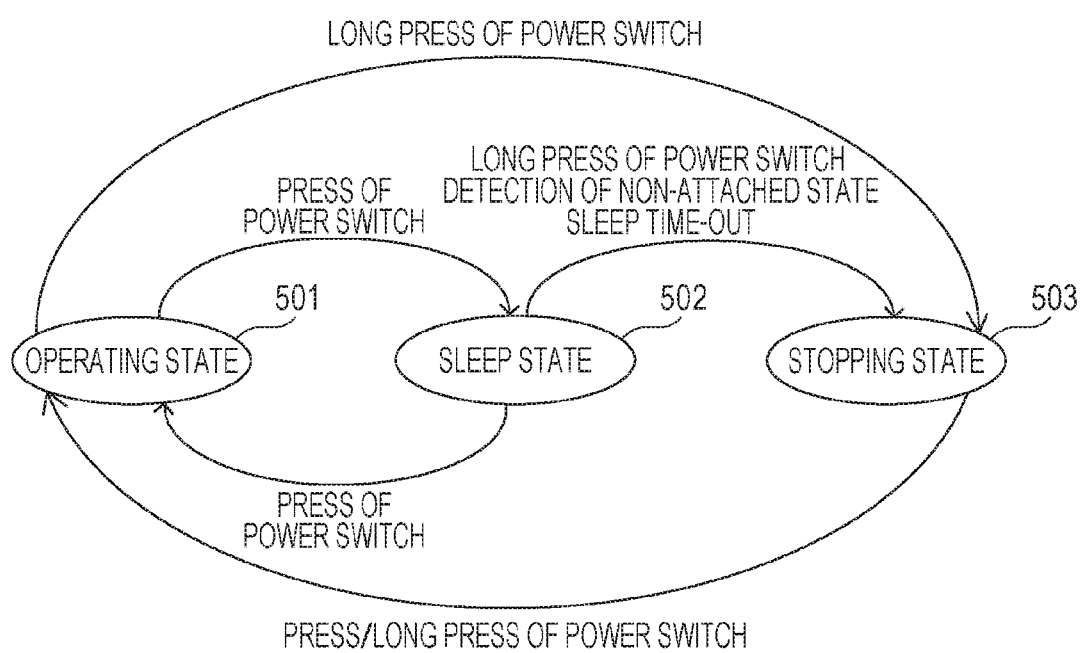
FIG. 5 is a diagram of transitions of operation states of the digital camera in a first exemplary embodiment.

Next, transitions of operation states of the digital camera 100 will be described with reference to FIG. 5. FIG. 5 is a diagram of transitions of the operation states of the digital camera 100. Note that, the attached state in which the digital camera 100 is attached to the cellular phone 200 is provided in each of the operation states of FIG. 5.

The digital camera 100 has three operation states of the operating state 501, the sleep state 502, and a stopping state 503.

The operating state 501 is a state where the system control unit 121 of the digital camera 100 operates with respect to the image capturing unit 104, the operation unit 113, the communication I/F 110, and the like. That is, the operating state 501 is a state where an image capturing function and a communication function of the digital camera 100 are operating. Thus, in the operating state 501, image capturing by the image capturing unit 104 and communication of data by the communication I/F 110 are allowed.

The sleep state 502 is a state where electrical power is not supplied to the image capturing unit 104 of the digital camera 100 and photography by the digital camera 100 is not allowed. At the same time, the sleep state 502 is a state where electrical power is supplied to the communication I/F 110, the system control unit 121, and the like of the digital camera 100 and the digital camera 100 is allowed to perform wireless communication. That is, the sleep state 502 is a state where the image capturing function of the digital camera 100 is being stopped and the communication function is operating. Thus, in the sleep state 502, the communication with the cellular phone 200 by the communication I/F 110 is maintained and power consumption of the digital camera 100 is less than that of the operating state 501.

When the digital camera 100 is in the operating state 501 and the wireless communication with the cellular phone 200 is established, even in the case of a transition from the operating state 501 to the sleep state 502, the wireless communication is not disconnected, but maintained. When the digital camera 100 is in the sleep state 502, radio wave intensity of the wireless communication is reduced in consideration of power consumption. Accordingly, power consumption of the communication I/F 110 in the sleep state 502 becomes small compared to power consumption in the operating state 501. However, the radio wave intensity of the wireless communication in the sleep state 502 may not be reduced. Even in this case, in the sleep state 502, since electrical power is not supplied to the image capturing unit 104 or the like, entire power consumption of the digital camera 100 becomes small compared to that of the operating state 501. Note that, at a time of a transition from the operating state 501 to the sleep state 502, a communication method may be switched to one that has smaller power consumption. For example, it is considered that switch is performed from a high speed communication mode such as the wireless LAN or Bluetooth to communication by Bluetooth Low Energy.

The stopping state 503 is a state where electrical power is not supplied to the image capturing unit 104 or the communication I/F 110 and neither the photography nor the wireless communication by the digital camera 100 is allowed. That is, the stopping state 503 is a state where the image capturing function and the communication function of the digital camera 100 are being stopped. Thus, in the stopping state 503, neither image capturing by the image capturing unit 104 nor communication of data by the communication I/F 110 is allowed.

A transition among the three operation states described above is caused by a press of the power switch 116, a change of the attachment state, or elapse of a fixed time.

As illustrated in FIG. 5, in a case where the power switch 116 is pressed when the operation state of the digital camera 100 is the operating state 501, the operation state makes a transition to the sleep state 502. In a case where the power switch 116 is pressed for a predetermined time (hereinafter, referred to as a long press) in the operating state 501, the operation state makes a transition to the stopping state 503. The system control unit 121 judges whether the power switch 116 is subjected to a press or a long press.

In a case where the power switch 116 is pressed when the operation state of the digital camera 100 is the sleep state 502, the operation state makes a transition to the operating state 501. Further, in a case where a long press is performed for the power switch 116 in the sleep state 502, the operation state makes a transition to the stopping state 503. In the sleep state 502, a transition of the operation state is caused also by a change of the attachment state. When the system control unit 121 detects a change from the attached state to the non-attached state in the sleep state 502, the operation state makes a transition to the stopping state 503. In addition, in a case where the fixed time elapses in the sleep state 502, time-out occurs to the sleep state 502 (hereinafter, referred to as sleep time-out), and the operation state makes a transition to the stopping state 503. A time of this time-out is monitored by the system timer 122. The time of time-out may be able to be set freely by the user from the digital camera 100 or the cellular phone 200.

In a case where a press or a long press is performed for the power switch 116 when the operation state of the digital camera 100 is the stopping state 503, the operation state makes a transition to the operating state 501.

It is set that the attached state in which the digital camera 100 is attached to the cellular phone 200 is provided in each of the operation states of FIG. 5. Transitions of the operation states of the digital camera 100 in the non-attached state in which the digital camera 100 is detached from the cellular phone 200 are only performed between the operating state 501 and the stopping state 503. These transitions of the states are performed when the power switch 116 is pressed, regardless of whether the power switch 116 is subject to a press or a long press.

(Operation of Digital Camera 100)

Figure 6:
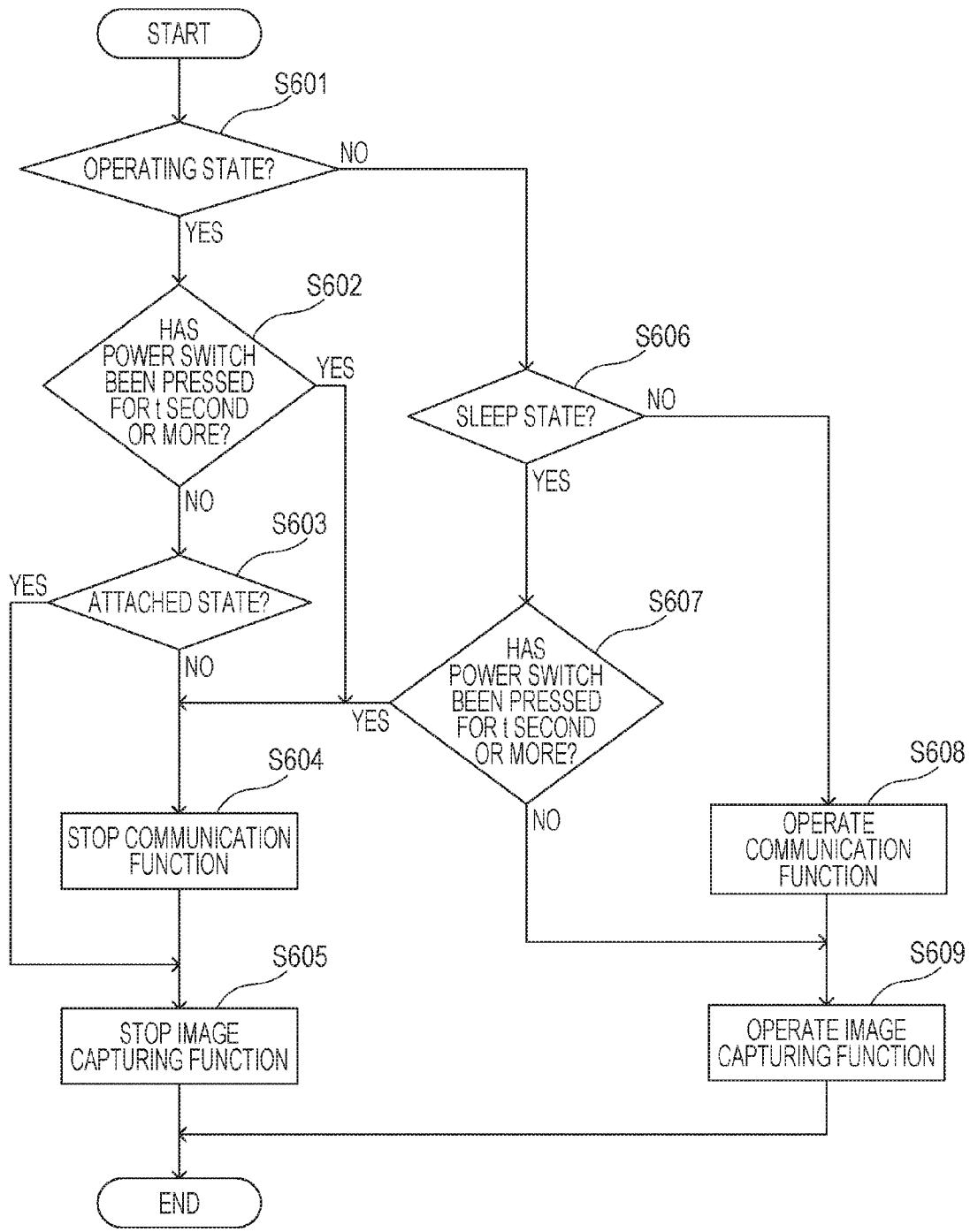
FIG. 6 is a flowchart illustrating an operation of the digital camera in the first exemplary embodiment.

Next, an operation of the digital camera 100 when a press or a long press is performed for the power switch 116 of the digital camera 100 will be described with reference to FIG. 6. FIG. 6 is a flowchart illustrating the operation of the digital camera 100 from a time point when the press or the long press is performed for the power switch 116 of the digital camera 100.

At step S601, the system control unit 121 judges whether or not the operation state of the digital camera 100 is the operating state 501. In the case of judging that the operation state is the operating state 501, the system control unit 121 progresses processing to step S602. On the other hand, in the case of judging that the operation state is not the operating state 501, the system control unit 121 progresses the processing to step S606.

At step S602, the system control unit 121 judges whether or not the power switch 116 of the digital camera 100 has been pressed for t second or more, which is a predetermined time. In the case of judging that the power switch 116 has been pressed for t second or more, the system control unit 121 is to determine to cause a transition of the operation state of the digital camera 100 to the stopping state 503, and the system control unit 121 progresses the processing to step S604. On the other hand, in the case of judging that the power switch 116 has been pressed for less than t second, the system control unit 121 progresses the processing to step S603.

Note that, t second means a time used for a judgment of a long press and a press of the power switch 116, and pressing the power switch 116 for t second or more means a long press and pressing it for less than t second does not mean a long press but a press. This t second is decided as appropriate. t second at step S607 described below also has a function similar to that of t second at step S602.

At step S603, the system control unit 121 judges whether or not the digital camera 100 is in the state of being attached to the cellular phone 200, that is, whether or not the digital camera 100 is in the attached state. In the case of judging that the digital camera 100 is in the attached state, the system control unit 121 is to determine to cause a transition of the operation state of the digital camera 100 to the sleep state 502, and progresses the processing to step S605. On the other hand, in the case of judging that the digital camera 100 is in the non-attached state, the system control unit 121 is to determine to cause a transition of the operation state of the digital camera 100 to the stopping state 503, and progresses the processing to step S604. Note that, the judgment as to whether or not the digital camera 100 is attached to the cellular phone 200 is performed by the above-described detecting method of the attachment state of the digital camera 100.

At step S604, the system control unit 121 stops supplying electrical power to the communication I/F 110 and stops the communication function of the digital camera 100, and progresses the processing to step S605.

At step S605, the system control unit 121 stops supplying electrical power to the image capturing unit 104 and stops the image capturing function of the digital camera 100. At step S605, the system control unit 121 may perform processing of housing the image capturing lens 102 of the digital camera 100.

Note that, when the processing is performed in order of steps S603 and S605, since the image capturing function of the digital camera 100 is being stopped, the communication function is operating, and the communication with the cellular phone 200 is being maintained, the operation state is the sleep state 502. When the processing is performed in order of steps S603, S604, and S605, since the image capturing function and the communication function of the digital camera 100 are being stopped, the operation state is the stopping state 503.

At step S606, the system control unit 121 judges whether or not the operation state of the digital camera 100 is the sleep state 502. In a case where the system control unit 121 judges that the operation state is the sleep state 502, the system control unit 121 progresses the processing to step S607. On the other hand, in a case where the system control unit 121 judges that the operation state is not the sleep state 502, the system control unit 121 is to determine to cause a transition of the operation state of the digital camera 100 to the operating state 501, and progresses the processing to step S608.

At step S607, the system control unit 121 judges whether or not the power switch 116 of the digital camera 100 has been pressed for t second or more. In the case of judging that the power switch 116 has been pressed for t second or more, the system control unit 121 is to determine to cause a transition of the operation state of the digital camera 100 to the stopping state 503, and progresses the processing to step S604. On the other hand, in the case of judging that the power switch 116 has been pressed for less than t second, the system control unit 121 is to determine to cause a transition of the operation state of the digital camera 100 to the operating state 501, and progresses the processing to step S609.

At step S608, the system control unit 121 starts supplying electrical power to the communication I/F 110 and causes the communication function of the digital camera 100 to operate, and progresses the processing to step S609.

At step S609, the system control unit 121 starts supplying electrical power to the image capturing unit 104 and causes the image capturing function of the digital camera 100 to operate.

Note that, when the processing at step S609 is performed, the image capturing function and the communication function of the digital camera 100 are operating, the operation state of the digital camera 100 is the operating state 501. In addition, at step S609, the system control unit 121 may perform processing of developing the image capturing lens 102 of the digital camera 100.

Figure 7:
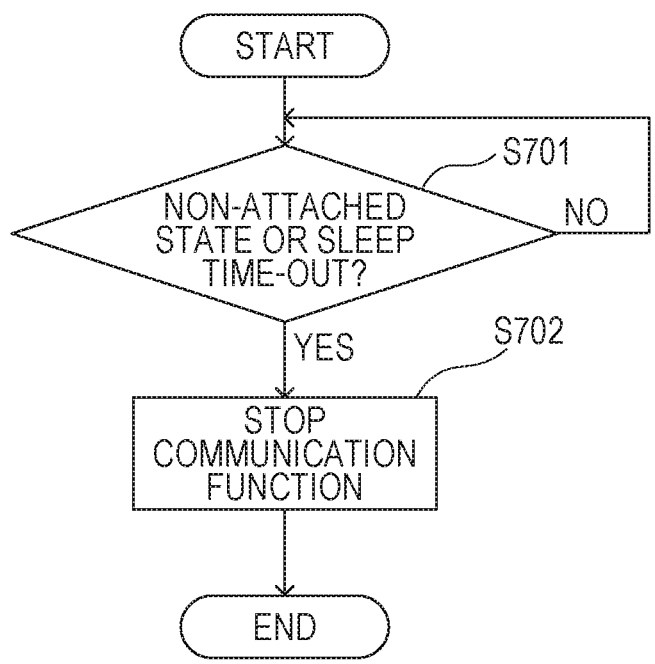
FIG. 7 is a flowchart illustrating the operation of the digital camera in the first exemplary embodiment.

Next, description will be given for an operation of the digital camera 100, when the digital camera 100 is in the attached state and the operation state thereof makes a transition to the sleep state 502, with reference to FIG. 7. FIG. 7 is a flowchart illustrating the operation of the digital camera 100 from a time point when the digital camera 100 is in the attached state and the operation state thereof makes the transition to the sleep state 502.

Note that, since the processing of a case where, when the digital camera 100 is in the attached state and the operation state thereof makes the transition to the sleep state 502, the power switch 116 is pressed has been described with FIG. 6, description thereof will be omitted here.

At step S701, the system control unit 121 judges whether or not the digital camera 100 is brought in the non-attached state which is a state of not being attached to the cellular phone 200. In a case where the system control unit 121 judges that the digital camera 100 is in the non-attached state, the processing is progresses to step S702.

The system control unit 121 further judges whether or not a fixed time elapsed in the sleep state 502 and the sleep time-out occurred. In a case where the system control unit 121 judges that the sleep time-out occurred, the system control unit 121 progresses the processing to step S702.

In the case of judging that the digital camera 100 is not in the non-attached state and sleep time-out does not occur, the system control unit 121 progresses the processing to step S701 again.

At step S702, the system control unit 121 stops supplying electrical power to the communication I/F 110, and stops the communication function of the digital camera 100. Note that, when the processing of step S702 is performed, since the image capturing function and the communication function of the digital camera 100 are being stopped, the operation state is the stopping state 503.

As described above, the digital camera 100 of the present exemplary embodiment has the sleep state 502 in which the image capturing function is being stopped and the communication function is operating. Accordingly, it is possible to suppress power consumption of the digital camera 100 and maintain the communication of the digital camera 100 and the cellular phone 200, thus making it possible to avoid missing an opportunity for photography.

In addition, when being the sleep state 502, the operation state of the digital camera 100 makes a transition to the operating state 501 with a press of the power switch 116, as illustrated in FIG. 5. At this time, the communication function of the digital camera 100 is operating before and after this transition, and the wireless communication of the digital camera 100 and the cellular phone 200 is being maintained. Accordingly, when the user finds an opportunity for photography and changes the operation state of the digital camera 100 from the sleep state 502 to the operating state 501, it is not necessary to wait until the wireless communication of the digital camera 100 and the cellular phone 200 is established, thus making it possible to avoid missing the opportunity for photography.

Further, the user is able to cause a transition of the operation state of the digital camera 100 with an operation on the power switch 116 as illustrated in FIG. 5. Accordingly, the user is able to select the operation state of the digital camera 100 according to a probability of having an opportunity for photography or the like. For example, when thinking that there will be no opportunity for photography for a while, the user brings the operation state into the stopping state 503. In this manner, in addition to avoiding missing the opportunity for photography, it is possible to prevent the digital camera 100 from consuming electrical power more than necessary. Furthermore, differently from a case where the operation state of the digital camera 100 is caused to make a transition by the cellular phone 200, which will be described below, the operation state of the digital camera 100 is able to be caused to make a transition even when the communication function of the digital camera 100 is being stopped.

Second Exemplary Embodiment (User Interface of Cellular Phone 200)

Next, the digital camera 100 and the cellular phone 200 of a second exemplary embodiment will be described. In the present exemplary embodiment, described is an embodiment in which an operation regarding power is allowed also from a cellular phone 200 side in addition to an operation on the power switch 116 from a digital camera 100 side. Note that, description of a part of the present exemplary embodiment, which is similar to that of the first exemplary embodiment, will be omitted or simplified.

First, a user interface of the cellular phone 200 of the present exemplary embodiment will be described with reference to FIGS. 8A and 8B. FIG. 8A illustrates an example of an operation screen of the camera application of the cellular phone 200 in the present exemplary embodiment.

As illustrated in FIG. 8A, when the wireless communication with the digital camera 100 is established, a wireless communication icon 801 is displayed on the display unit 207 of the cellular phone 200. On the other hand, when the wireless communication with the digital camera 100 is disconnected, the wireless communication icon 801 is hidden. In a case where the wireless communication with the digital camera 100 is established, the user is able to perform photography by pressing a shutter button 808 displayed on the display unit 207.

When the digital camera 100 is attached to the cellular phone 200, that is, in the case of the attached state, an attachment judgment icon 802 is displayed on the display unit 207. On the other hand, when the digital camera 100 is not attached thereto, that is, in the case of the non-attached state, the attachment judgment icon 802 is hidden.

The judgment as to whether or not the digital camera 100 is attached to the cellular phone 200 is performed by the above-described detecting method of the attachment state of the digital camera 100. In a case where the digital camera 100 performs the detection of the attachment state, the cellular phone 200 receives a detection result from the digital camera 100 via the communication I/F 210.

The operation state of the digital camera 100 is displayed in a region 803 of the display unit 207 of the cellular phone 200. When the operation state of the digital camera 100 is the operating state 501, an operating state icon 804 is displayed in the region 803. Similarly, when the operation state of the digital camera 100 is the sleep state 502, a sleep state icon 805 is displayed in the region 803, and when the operation state is the stopping state 503, a stopping state icon 806 is displayed.

The cellular phone 200 receives the operation state of the digital camera 100 from the digital camera 100 via the communication I/F 210 by using, for example, proximity communication such as wireless LAN communication, NFC, or Bluetooth, similarly to the above-described case of the attachment judgment icon 802.

Note that, when the operation state of the digital camera 100 is the stopping state 503, since the communication function of the digital camera 100 is being stopped, the cellular phone 200 is not able to receive the operation state from the digital camera 100. Thus, when the wireless communication with the digital camera 100 is not allowed, the cellular phone 200 may display the stopping state icon 806. Moreover, when the wireless communication with the digital camera 100 is not allowed, the cellular phone 200 may not display any icon in the region 803. In this case, the stopping state icon 806 is not to be used. In addition, as illustrated in FIG. 8B, a message 809 may be displayed on the display unit 207 of the cellular phone 200.

A power icon 807 is displayed on the display unit 207 of the cellular phone 200. By performing a tap or a long tap, which is a tap for a fixed time, for the power icon 807, the user is able to give an instruction of a transition of the operation state of the digital camera 100 via the wireless communication. Accordingly, with an operation on the power icon 807, the user is able to control the operation state of the digital camera 100 similarly to the power switch 116 described in the first exemplary embodiment.

For example, in a case where, when the digital camera 100 is in the operating state 501, the user taps the power icon 807, the cellular phone 200 transmits a command by the wireless communication, and causes the operation state of the digital camera 100 to make a transition to sleep state 502. Similarly, in a case where, when the digital camera 100 is in the operating state 501, the user performs a long tap for the power icon 807, the cellular phone 200 transmits a command by the wireless communication, and causes the operation state of the digital camera 100 to make a transition to the stopping state 503. Similarly, in a case where, also when the digital camera 100 is in the sleep state 502, the user performs a tap or a long tap for the power icon 807, the cellular phone 200 transmits a command by the wireless communication, and causes the operation state of the digital camera 100 to make a transition to the operating state 501 or the stopping state 503.

However, when the digital camera 100 is in the stopping state 503, since the communication function of the digital camera 100 is being stopped, it is not possible to cause, from the cellular phone 200, the operation state of the digital camera 100 to make a transition.

When a command is transmitted from the cellular phone 200 to the digital camera 100 and the operation state of the digital camera 100 is caused to make a transition to the stopping state 503, the cellular phone 200 may display a screen which prompts the user to bring the digital camera 100 into the operating state 501. An example thereof is illustrated in FIG. 8B. In the example of FIG. 8B, the message 809 prompts the user to perform an operation so as to bring the digital camera 100 into the operating state 501.

(Operation of Cellular Phone 200)

Next, an operation of the cellular phone 200 will be described with reference to FIG. 9. FIG. 9 is a flowchart illustrating the operation of the cellular phone 200 from a time point when a tap or a long tap is performed for the power icon 807 of the cellular phone 200. Note that, the cellular phone 200 receives the attachment state and the operation state of the digital camera 100 from the digital camera 100 via the communication I/F 210.

At step S901, the system control unit 221 of the cellular phone 200 receives the operation state of the digital camera 100 via the communication I/F 210. In a case where the operation state is the operating state 501, the system control unit 221 progresses processing to step S902. On the other hand, in a case where the operation state is not the operating state 501, the system control unit 221 progresses the processing to step S907.

At step S902, the system control unit 221 judges whether or not the power icon 807 illustrated in FIG. 8A has been tapped for t second or more. In the case of judging that the power icon 807 has been tapped for t second or more, the system control unit 221 is to determine to cause a transition of the operation state of the digital camera 100 to the stopping state 503, and progresses the processing to step S904. On the other hand, in the case of judging that the power icon 807 has been tapped for less than t second, the system control unit 221 progresses the processing to step S903.

Note that, t second means a time used for a judgment of a tap and a long tap of the power icon 807, and tapping the power icon 807 for t second or more means a long tap and tapping it for less than t second does not mean a long tap but a tap. This t second is decided as appropriate. t second at step S907 described below also has a function similar to that of t second at step S902.

At step S903, the system control unit 221 receives the attachment state from the digital camera 100 via the communication I/F 210. In a case where the digital camera 100 is in the attached state, the system control unit 221 is to determine to cause a transition of the operation state of the digital camera 100 to the sleep state 502, and progresses the processing to step S906. On the other hand, in the case of the non-attached state, the system control unit 221 is to determine to cause a transition of the operation state of the digital camera 100 to the stopping state 503, and progresses the processing to step S904.

At step S904, the system control unit 221 transmits a command of stopping the image capturing function to the digital camera 100 via the communication I/F 210. The digital camera 100 which has received the command of stopping the image capturing function stops the image capturing function in response to the command.

At step S905, the system control unit 221 transmits a command of stopping the communication function to the digital camera 100 via the communication I/F 210. The digital camera 100 which has received the command of stopping the communication function stops the communication function in response to the command. By the transmission of the command at step S905, the operation state of the digital camera 100 is brought into the stopping state 503 in which the image capturing function and the communication function are being stopped.

At step S906, the system control unit 221 transmits the command of stopping the image capturing function to the digital camera 100 via the communication I/F 210. The digital camera 100 which has received the command of stopping the image capturing function stops the image capturing function in response to the command. By the transmission of the command at step S906, the operation state of the digital camera 100 is brought into the sleep state 502 in which the image capturing function is being stopped and the communication function is operating.

Next, step S907 will be described. As to the operation of the cellular phone 200, which is illustrated in FIG. 9, it is premised that the communication function of the digital camera 100 is operating, unless the command of stopping the communication function has been transmitted. Moreover, the processing at step S907 is performed when the digital camera 100 is judged not to be in the operating state 501 at step S901. Accordingly, at step S907, the operation state of the digital camera 100 is the sleep state 502.

At step S907, the system control unit 221 judges whether or not the power icon 807 has been tapped for t second or more. In the case of judging that the power icon 807 has been tapped for t second or more, the system control unit 221 is to determine to cause a transition of the operation state of the digital camera 100 to the stopping state 503, and progresses the processing to step S904. On the other hand, in the case of judging that the power icon 807 has been tapped for less than t second, the system control unit 221 is to determine to cause a transition of the operation state of the digital camera 100 to the operating state 501, and progresses the processing to step S909.

At step S909, the system control unit 221 transmits a command of operating the image capturing function to the digital camera 100 via the communication I/F 210. The digital camera 100 which has received the command of operating the image capturing function operates the image capturing function in response to the command. By the transmission of the command at step S909, the operation state of the digital camera 100 is brought into the operating state 501 in which the image capturing function and the communication function are operating.

Note that, when receiving one or two of the command of stopping the communication function, the command of operating the image capturing function, and the command of stopping the image capturing function, the digital camera 100 causes a transition of the operation state. Thus, it is possible to refer to one or two of the command of stopping the communication function, the command of operating the image capturing function, and the command of stopping the image capturing function as a command of causing a transition of the operation state of the digital camera 100.

As described above, in the present exemplary embodiment, the user is able to cause a transition of the operation state of the digital camera 100 by operating the cellular phone 200. Therefore, the user is able to operate the whole of the image capturing system, which is composed of the digital camera 100 and the cellular phone 200, as one digital camera, and operability is improved.

In addition, similarly to the digital camera 100 of the first exemplary embodiment, the digital camera 100 of the present exemplary embodiment is able to maintain the communication of the digital camera 100 and the cellular phone 200 in addition to suppressing power consumption of the digital camera 100, so that it is possible to avoid missing an opportunity for photography. Further, when the user finds an opportunity for photography and changes the operation state of the digital camera 100 from the sleep state 502 to the operating state 501, it is not necessary to wait until the wireless communication of the digital camera 100 and the cellular phone 200 is established, thus making it possible to avoid missing the opportunity for photography. Furthermore, it is possible to prevent the digital camera 100 from consuming electrical power more than necessary.

Other Exemplary Embodiments

In the above-described exemplary embodiments, a transition of the operation state of the digital camera 100 is caused by two operation methods. For example, these two operation methods in the first exemplary embodiment are a press and a long press of the power switch 116. However, the operation for causing the transition of the operation state of the digital camera 100 is not limited to the two operation methods, and operation methods may be different, for example, in each transition illustrated with an arrow in FIG. 5.

In the above-described exemplary embodiments, the communication of the digital camera 100 and the cellular phone 200 is performed in a wireless manner. However, the communication I/F 110 of the digital camera 100 and the communication I/F 210 of the cellular phone 200 may be wired interfaces such as USBs, and the communication of the digital camera 100 and the cellular phone 200 may be performed in a wired manner.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-099686, filed on May 15, 2015, which is hereby incorporated by reference herein in its entirety.

What is claimed is:

1. An image capturing device capable of being attached to a communication apparatus for use, comprising:
    a processor;
    a wireless communication interface; and
    an image sensor,
    wherein the processor is configured to function as the following units:
    a communication control unit configured to control wireless communication with the communication apparatus via the communication interface; and
    a transition unit configured to cause an operation state of the image capturing device to make a transition to any of a plurality of operation states including a first state in which image capturing by the image capturing device and communication of data by the wireless communication are possible and a second state in which power consumption is less than that of the first state, wherein
    in a case where, in the first state and in a state where the image capturing device is attached to the communication apparatus, it is judged that a first operation is performed, the communication control unit performs control of maintaining the wireless communication with the communication apparatus and the transition unit causes the operation state of the image capturing device to make a transition to the second state, and
    in a case where, in the first state and in a state where the image capturing device is not attached to the communication apparatus, it is judged that the first operation is performed, the communication control unit does not perform control of maintaining the wireless communication with the communication apparatus.

2. The image capturing device according to claim 1, wherein photography by the image sensor is not allowed in the second state.

3. The image capturing device according to claim 1, wherein the transition unit causes the operation state of the image capturing device to make a transition to the first state in a case where, in the second state, it is judged that a second operation is performed.

4. The image capturing device according to claim 3, wherein the transition unit causes the operation state of the image capturing device to make a transition to a third state in which image capturing by the image capturing unit and communication of data by the wireless communication are not allowed in a case where, in the first state, it is judged that a third operation is performed, and
    the transition unit causes the operation state of the image capturing device to make a transition to the third state in a case where, in the second state, it is judged that a fourth operation is performed.

5. The image capturing device according to claim 4, further comprising an operation unit accepting the first to fourth operations.

6. The image capturing device according to claim 5, wherein the first operation and the second operation are the same operation, and the third operation and the fourth operation are the same operation.

7. The image capturing device according to claim 1, further comprising a detecting unit configured to detect an attachment state of the image capturing device to the communication apparatus.

8. The image capturing device according to claim 7, wherein the detecting unit detects the attachment state of the image capturing device to the communication apparatus by a switch, which is capable of detecting a contact with the communication apparatus and is mechanical, or communication with the communication apparatus.

9. The image capturing device according to claim 1, wherein the communication control unit communicates with the communication apparatus with a first communication method in the first state and communicates with the communication apparatus with a second communication method in the second state.

10. The image capturing device according to claim 9, wherein the first communication method is based on a wireless LAN.

11. The image capturing device according to claim 9, wherein the second communication method is based on Bluetooth.

12. The image capturing device according to claim 9, wherein the second communication method is based on Bluetooth Low Energy.

13. A communication apparatus capable of being attached to an image capturing device, which has an image capturing unit and a first communication unit, for use, the communication apparatus comprising:
a processor; and
a wireless communication interface,
wherein the processor is configured to function as the following units:
a communication control unit configured to control wireless communication with the image capturing device via the communication interface; and
a determination unit configured to determine, in a case where the image capturing device is in a first state in which image capturing by the image capturing device and communication of data by the wireless communication are possible and, in a state where the image capturing device is attached to the communication apparatus, it is judged that a first operation is performed, to cause an operation state of the image capturing device to make a transition to a second state in which communication with the communication apparatus by the first communication unit is maintained and power consumption is less than that of the first state, wherein
the communication control unit transmits the determination by the determination unit to the image capturing device.

14. A controlling method of an image capturing device capable of being attached to a communication apparatus for use, wherein
in a case where the image capturing device is in a first state and, in a state where the image capturing device is attached to the communication apparatus, it is judged that a first operation is performed, wireless communication with the communication apparatus is maintained and an operation state of the image capturing device is caused to make a transition to a second state,
in a case where, in the first state and in a state where the image capturing device is not attached to the communication apparatus, it is judged that the first operation is performed, the wireless communication with the communication apparatus is not maintained, and
the first state is a state in which image capturing by the image capturing device and communication of data by the wireless communication are possible, and the second state is a state in which power consumption is less than that of the first state.

15. A controlling method of a communication apparatus capable of being attached to an image capturing device, which has an image capturing unit and a first communication unit, for use, wherein
in a case where the image capturing device is in a first state and, in a state where the image capturing device is attached to the communication apparatus, it is judged that a first operation is performed, communication with the image capturing device is maintained, and
in a case where the image capturing device is in the first state and, in a state where the image capturing device is attached to the communication apparatus, it is judged that the first operation is performed, communication with the communication apparatus by the first communication unit is maintained and an operation state of the image capturing device is caused to make a transition to a second state,
the first state is a state in which image capturing by the image capturing device and communication of data by the wireless communication are possible, and the second state is a state in which power consumption is less than that of the first state, and
the judgment is transmitted to the image capturing device.

16. A non-transitory computer readable storage medium on which a program is stored, the program, when read and executed by a computer, causing the computer to perform the following method:
a controlling method of an image capturing device capable of being attached to a communication apparatus for use, the controlling method comprising:
in a case where, the image capturing device is in a first state and; in a state where the image capturing device is attached to the communication apparatus, it is judged that a first operation is performed, maintaining wireless communication with the communication apparatus and causing an operation state of the image capturing device to make a transition to a second state;
in a case where, the image capturing device is in the first state, and in a state where the image capturing device is not attached to the communication apparatus, it is judged that the first operation is performed, not maintaining the wireless communication with the communication apparatus,
wherein the first state is a state in which image capturing by the image capturing device and communication of data by the wireless communication are possible, and the second state is a state in which power consumption is less than that of the first state.

17. A non-transitory computer readable storage medium on which a program is stored, the program, when read and executed by a computer, causing the computer to perform the following method:
a controlling method of a communication apparatus capable of being attached to an image capturing device for use, the image capturing device having an image capturing unit and a first communication unit, the controlling method comprising:
in a case where, the image capturing device is in a first state and; in a state where the image capturing device is attached to the communication apparatus, it is judged that a first operation is performed, maintaining communication with the image capturing device, and
in a case where, the image capturing device is in the first state and in a state where the image capturing device is attached to the communication apparatus, it is judged that the first operation is performed, maintaining communication with the communication apparatus by the first communication unit and causing an operation state of the image capturing device is to make a transition to a second state,
wherein the first state is a state in which image capturing by the image capturing device and communication of data by the wireless communication are possible, and the second state is a state in which power consumption is less than that of the first state, and
wherein the judgment that the first operation is performed is transmitted to the image capturing device.

* * * * *